United States Patent [19]

Harvey

[11] Patent Number: 4,980,710
[45] Date of Patent: Dec. 25, 1990

[54] FILM TRANSPORT SPEED CONTROL

[75] Inventor: Donald M. Harvey, Webster, N.Y.

[73] Assignee: Eastman Kodak Company, Rochester, N.Y.

[21] Appl. No.: 457,906

[22] Filed: Dec. 27, 1989

[51] Int. Cl.$^5$ .............................................. G03B 1/18
[52] U.S. Cl. ................................. 354/173.1; 354/213; 354/215
[58] Field of Search .................... 354/170, 171, 173.1, 354/173.11, 212, 213, 215

[56] References Cited

U.S. PATENT DOCUMENTS

| | | | |
|---|---|---|---|
| 3,677,159 | 7/1972 | Studley | 354/173.11 |
| 4,075,644 | 2/1978 | Hosono | 354/173.11 |
| 4,141,635 | 2/1979 | Asano | 354/173.11 |
| 4,175,845 | 11/1979 | Iwashita et al. | 354/173.11 |
| 4,401,376 | 8/1983 | Pomazi | 354/213 X |
| 4,431,292 | 2/1984 | Takahashi | 354/173.11 |
| 4,474,442 | 10/1984 | Shiozawa et al. | 354/173.11 |
| 4,697,899 | 10/1987 | Kawamura et al. | 354/173.11 |

Primary Examiner—Brian W. Brown
Assistant Examiner—Howard B. Blankenship
Attorney, Agent, or Firm—Roger A. Fields

[57] ABSTRACT

The speed of frame-to-frame advance after exposure in a camera having a pawl which acts with a single perforation per frame film to provide frame registration with an aperture station is optimized without film distortion by generation of a motor control circuit feedback signal giving information as to position and speed of the advancing next frame perforation. In one embodiment, a sensor develops a pulsed signal from the toothed edge of a pawl that travels with the film perforation. In another embodiment, the passage of a prerecorded pattern spaced a known distance from the perforation is sensed.

20 Claims, 2 Drawing Sheets

FILM TRANSPORT SPEED CONTROL

The present invention relates generally to an apparatus and method for driving film between frames for successive photographic exposures in a still camera system using film resident frame registration fiducials spaced along a film strip; and, more particularly, for providing position and velocity feedback from the film as it is being motor driven.

BACKGROUND OF THE INVENTION

In a still camera system that uses a single perforation per frame or other frame interval periodic film resident registering fiducial, information concerning the velocity and proximity of the film to the next available frame stopping point is needed if frame-to-frame transport time is to be minimized. Given this information, the motor speed or drive means can be controlled to provide the optimum drive for any given design.

Hosono U.S. Pat. No. 4,075,644 shows a camera system which uses a mechanical claw or pawl arrangement for stopping a film transport motor to bring the next available frame into registration with an exposure gate after exposure of the previous frame for a film having a single perforation per frame. In such a system, the drive means operates to move the film at constant speed until the motor is switched off when the pawl detects that the perforation has moved to the intended film stopping point. Registration is indicated when the pawl passes through the perforation into an alignment slot in the film feed wall as in Hosono or into a corresponding slot in a film cartridge as in Asano U.S. Pat. No. 4,141,635. Moving the film at constant speed limits the ability to achieve high speed frame-to-frame transfer. There is a tendency when the film is moved at high speeds for the frame to overshoot the exposure station, so that when the pawl forces registration by mechanical means, the forces acting to continue the movement may cause image distortion or emulsion damage due to stretching or stressing the film.

It is known in single speed still camera film drive mechanisms to prevent overshooting stresses by switching the motor off at a point prior to the stopping point, so that the film will coast into the alignment position due to the built-up momentum. The position of the film at motor switch-off is estimated based on elapsed drive time since motor actuation. The relationship between actual position and elapsed time, as well as the coasting speed and conditions, is, however, dependent on gear wear, battery temperature and other factors which may vary in unpredictable ways.

It is known in connection with cameras utilizing unperforated film as in Studley U.S. Pat. No. 3,677,159 and for single lens reflex cameras using multiple sprocket engaging perforations per frame as in Takahashi U.S. Pat. No. 4,431,292 to start reducing film transport velocity before the stop point. Most such systems track the drive means, not the progress of the advancing film itself to determine how frame-to-frame movement is progressing. In Takahashi, the travel distance of the film is tracked by counting the number of perforations which pass a given point, viz. the location of oppositely disposed LED and photodiode elements. For a 35 mm filmstrip having eight equally-spaced sprocket perforations per frame, Takahashi operates the wind-up motor at full speed until a count of six perforations is reached, and then reduces the running speed by either temporarily interrupting or limiting power to the motor for the remaining count of two perforations. Takahashi neither tracks the position of the film between perforations, nor monitors the speed of advance of the film. Such an arrangement is, therefore, not useful with films of the type having a single perforation per frame, or for providing film transport velocity and positional information to provide feedback for motor control during intervals of movement between perforations.

Other film transport speed deceleration systems are shown in Iwashita et al. U.S. Pat. No. 4,175,845; Shiozawa et al. U.S. Pat. No. 4,474,442; and Kawamura et al. U.S. Pat. No. 4,697,899. Such arrangements do not receive feedback through monitoring film resident fiducials.

SUMMARY OF THE INVENTION

The present invention provides an apparatus and method for the feedback control of film transport speed usable in a still camera having single perforation per frame or other periodic film resident aperture registering fiducial to determine the proper film movement stopping point which permits high speed frame-to-frame transfer without film distortion.

In one aspect of the invention a camera system, having means for detecting the fiducial associated with the next available frame and for interrupting the film transport at a desired stopping point in response thereto, is provided with means for monitoring the progressive movement of that fiducial during the film transport prior to interruption and for providing a feedback signal to control the film transport drive speed in order to optimize the frame-to-frame transfer process.

In a preferred embodiment, described in greater detail below, a feedback signal for control of frame-to-frame film transport is developed by a sensor which monitors the speed and position of engagement of a pawl tooth with the frame registration perforation of a camera loaded film of the single perforation per frame type. The pawl is movably mounted to engage the perforation at a point of film movement ahead of the stopping point and to move with the same until the pawl comes to rest within an aperture registration alignment slot in the wall of the camera or film cartridge. The pawl is provided with indicia which are sensed to generate a signal corresponding to the speed and position of the perforation as it moves together with the pawl. This signal is fed to the drive motor control circuit for reduction of the film transport speed as the next available frame nears its desired stopping point.

In an alternative embodiment of the invention, speed and position of the perforation is tracked by a sensor which reads secondary fiducial patterns located along said film strip in predetermined spaced relationship to each perforation and in respective association with each film frame. The positions and speed of passage of the patterns stimulate the generation of the feedback signal which is used to control the motor.

BRIEF DESCRIPTION OF THE DRAWINGS

Embodiments of the invention have been chosen for purpose of illustration and description, and are shown in the accompanying drawings, wherein.

Throughout the drawings, like elements are referred to by like numerals.

DETAILED DESCRIPTION OF PREFERRED EMBODIMENTS

Figure 1:
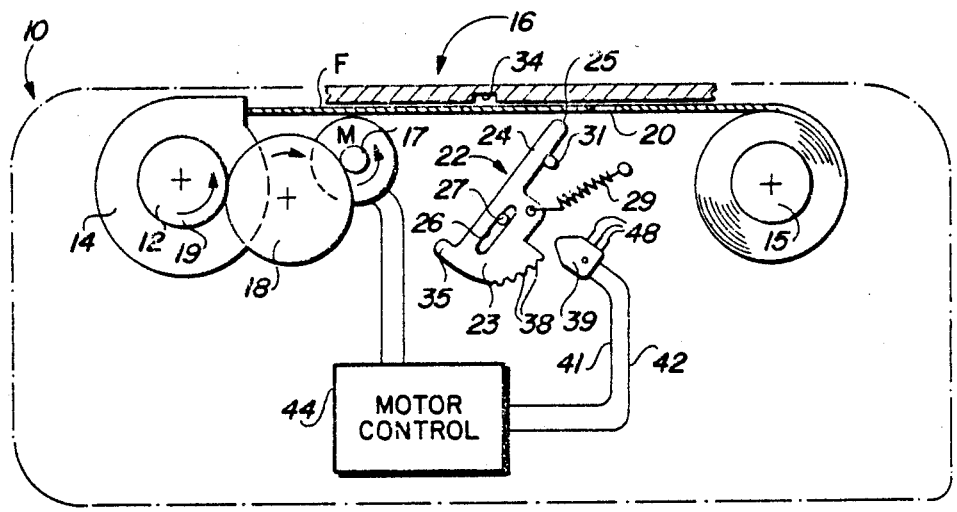
FIGS. 1–3 are schematic fragmentary views showing progressive movement of a film strip in frame-to-frame advancement in a still camera automatic film wind system employing an apparatus and method in accordance with an embodiment of the invention.
Figure 2:
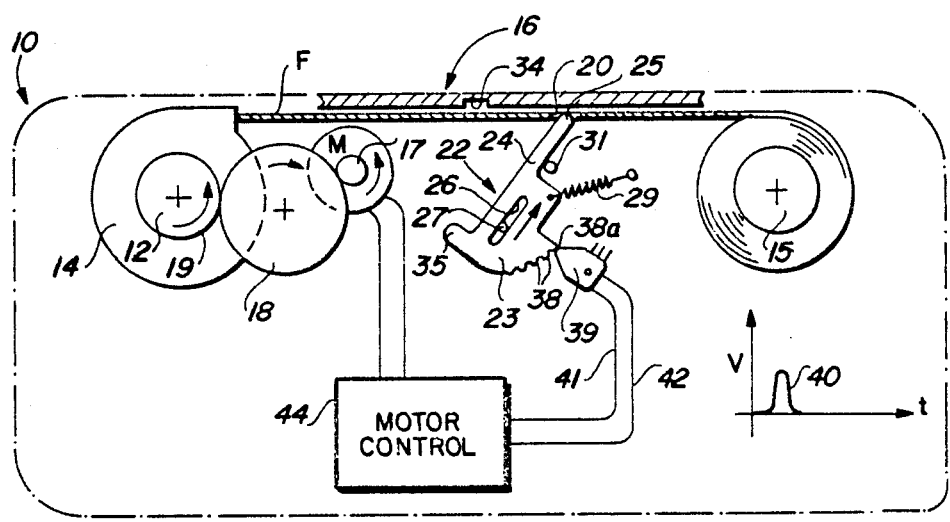
Figure 3:
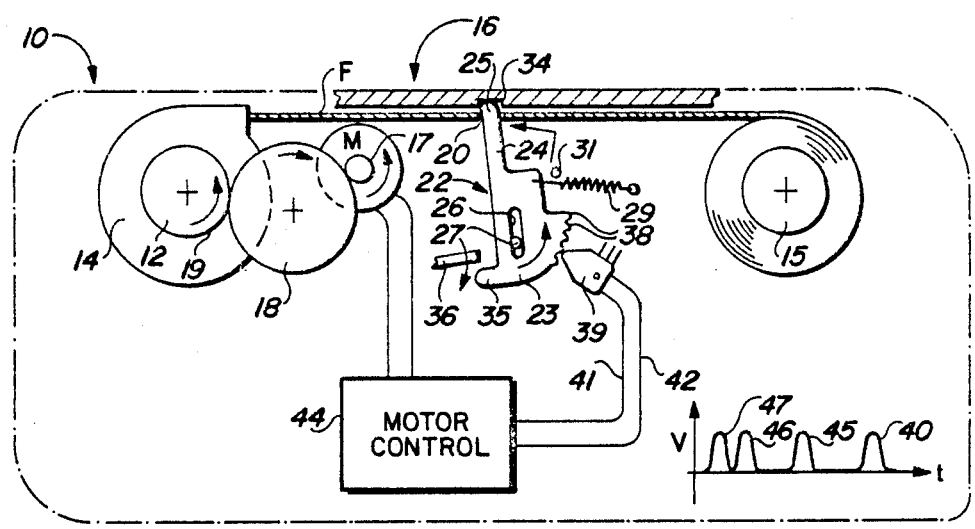

FIGS. 1-3 show an exemplary implementation of a method and apparatus in accordance with the invention in a still camera that uses a single perforation per frame film resident fiducial to determine the film movement stopping point for the motor-driven transport between exposures in the frame-to-frame advancement of a strip of film F.

As shown in FIGS. 1-3, film F is loaded in a still camera 10 for movement between a supply reel 12 located in a film cartridge 14 and a take-up reel 15 spaced laterally therefrom, across an exposure station 16 which is located in optical alignment with a camera lens (not shown) behind an aperture and shutter gate mechanism (not shown). The reels 12, 15 are both located within the lightproof body of the camera 10, and a frame of the film F positioned at exposure station 16 can be exposed by receiving light coming through the lens from an object to be photographed. After exposure of a frame, the loaded film is moved a distance between the reels 12, 15 to bring the next available unexposed frame into alignment with the exposure station 16, and so forth, for a series of successive frame exposures.

Transport of the frame-to-frame advance of the film strip F between exposures is effected by a wind motor M which has an output shaft driven pinion 17 mechanically coupled through gears 18, 19 to drive the spool of one of the reels 12, 15 in rotation about its axis in order to wind the strip F around the circumference of the spool spindle. The other spool may be left freewheeling to rotate about its axis in response to drawing of the film therefrom. For the arrangement shown, frame-to-frame advance occurs by driving the cartridge reel 12 to wind the film F by successive single frame lengths back into the cartridge 14, with the film being retrieved into the cartridge directly after exposure. It is to be understood, however, that the same principles apply in systems wherein frame-to-frame advance occurs in a direction from the supply reel 12 onto the take-up reel 15, such as by driving the takeup reel 15 and letting the supply reel 12 rotate freely.

The film F includes periodic film resident fiducials 20 spaced at frame length intervals which serve as markers for interaction with the camera wind-up mechanism to determine the film movement stopping points for frame registration with the exposure station 16. In FIGS. 1-3, the camera 10 is shown loaded with a film F having registration fiducials 20 in the form of perforations, one per frame. As with conventional film wind-up drive mechanisms, such as disclosed Hosono U.S. Pat. No. 4,075,644, means is provided to automatically feed the film F in response to completion of a photographic exposure cycle, and to continue the feed until a detected perforation corresponding to the next available frame is brought to a desired stopping point.

The shown frame detecting mechanism includes a claw or pawl 22 having a body portion 23 and an elongated arm portion 24 projecting therefrom, which ends in a detecting tooth 25 adapted to ride gently against a marginal portion of the film F in search of the perforations 20. The pawl 22 has an elongated slot 26, located on its body portion 23 and parallel to the arm portion 24 through which a guide pin or post 27 extends in the manner of a pivot about which the pawl 22 can rotate. The pawl 22 is urged in the clockwise direction and into contact with the film F by the biasing action of a spring 29. A pin 31 acts as a stop member to limit clockwise rotation. The pawl 22 is biased by the spring 29 so that its toothed end 25 (in the initial position shown in FIG. 1) will seek and enter the next perforation 20 that passes the pawl 22 as the film advances toward &he reel 12 as indicated by the right to left direction of the arrow. The elongation of the slot 26 permits the arm 24 to be urged outwardly under bias of the spring 29 to bring the tooth 25 through the perforation, as shown in FIG. 2. As the film F is drawn from reel 15 to reel 12 under action of the motor M, the end 25 of the pawl 22 will travel with the perforation 20 to rotate the pawl about the pin 27 in the counterclockwise direction as the film advances until the tooth 25 comes into engagement with a slot 34 in the film feed wall or connecting bridge portion of a cartridge as shown in FIG. 3, which signals the stopping point for film registration and the point at which further film drive by motor M is discontinued. Engagement of the end 25 with the slot 34 under bias of spring 29 maintains the frame in registration with the exposure gate, until after the exposure mechanism has been activated. The pawl 22 includes at its opposite end a lug 35 which provides a shoulder against which a lever 36 of the exposure assembly (see FIG. 3) can act to lift the end 25 of the pawl 22 out of the slot 34 and perforation 20 following exposure, to return the pawl 22 under bias of spring 29 back to the start position shown in FIG. 1.

Conventional wind-up drive mechanisms for frame-to-frame advance of the loaded film in still cameras utilizing single perforation per frame fiducials to signal the film transport stopping point move the film for the whole distance to the next frame at a single film drive speed. Thus, once start-up inertia is overcome, the film is moved at more or less constant speed until motor cut-off, clutch deactivation, or similar stopping action is initiated. This limits the capability of such systems to be utilized for high speed frame-to-frame advancement, such as where a rapid sequence of successive single frame exposures is desired because if the drive speed is made higher, the resulting increased momentum will try to coast the film after motor cut-off. If further movement is mechanically prevented by engagement of the pawl with a registration slot, the film is subject to damage or distortion which will interfere with the proper production of photographic images. To avoid this, in accordance with the invention, the frame registration fiducial detecting means is augmented by means which monitors the progress of the movement of the perforation from its start position to its film drive interruption stopping point (FIG. 3), to provide a feedback signal for control of the drive mechanism that sets the film transport speed. This enables the film transport process to be optimized in order to achieve high speed frame-to-frame advance, while maintaining frame registration accuracy without damaging or distorting the film.

For the embodiment of FIGS. 1-3, the body portion 23 of the pawl 22 is provided with indicia in the form of a plurality of teeth 38 formed on an outer edge of the pawl 22 at evenly-spaced intervals about an arc to rotate past a sensor 39 when the pawl 22 is caused to move with the film F after engagement of the end 25 in the perforation 20 (see FIG. 2) before engagement with the slot 34. As shown in FIG. 1, the first tooth 38a is located remotely from the sensor 39 when the end 25 is in its wind cycle start position. When the end 25 engages perforation 20 (FIG. 2), the pawl moves longitudinally of the slot 26 on the pin 27 to bring the first tooth 38a into position adjacent the sensor head. The remaining teeth 38 are arranged so that they are successively presented, one at a time, at the sensor 39 as the pawl 22 is pivot counterclockwise from the first perforation engagement position of FIG. 2 to the frame advance stop position of FIG. 3.

The sensor 39 may be an electromagnetic transducer of the type which will generate a voltage pulse upon passage of tooth 38 before the sensor head. A voltage signal 40, shown in FIG. 2, will thus be developed across sensor leads 41, 42 upon passage of the first tooth 38a past the sensor head. A motor control circuit 44 which may be constructed in accordance with known techniques (see, e.g., Studley U.S. Pat. No. 3,677,159) may be configured to respond to the pulse 40 to control film speed in accordance with the detection of the position of advance of the fiducial 20. The film drive speed may be reduced by changing the gearing, varying the power to the motor M, or controlling a clutch. The passage of additional teeth 38 past the head of the sensor 39 as the film transport progresses will produce additional pulses 45, 46, 47, until the film perforation comes into registration with the alignment slot 34 (FIG. 3). A pulse 40, 45, 46, 47 is produced at each passage of a tooth 38 past the head of sensor 39. Each pulse corresponds to the passage of the perforation 20 past a predetermined location away from the stopping point 34. The time interval separating the pulses 40, 45, 46, 47 is indicative of the speed at which the film is moving through those positions. Sensor positioning marks 48 (FIG. 1) can be used for calibration. The multiple pulses of the signal generated by the sensor 39 can thus be utilized to reduce the speed in stepwise fashion and/or apply successively greater braking action to the drive mechanism. In this manner, the advance of the film F to the next available frame can be accomplished in optimum fashion to minimize the frame-to-frame transport time, without the otherwise undesirable consequences associated with the advance of film at high speeds in conventional film resident frame registration fiducial systems.

Figure 4:
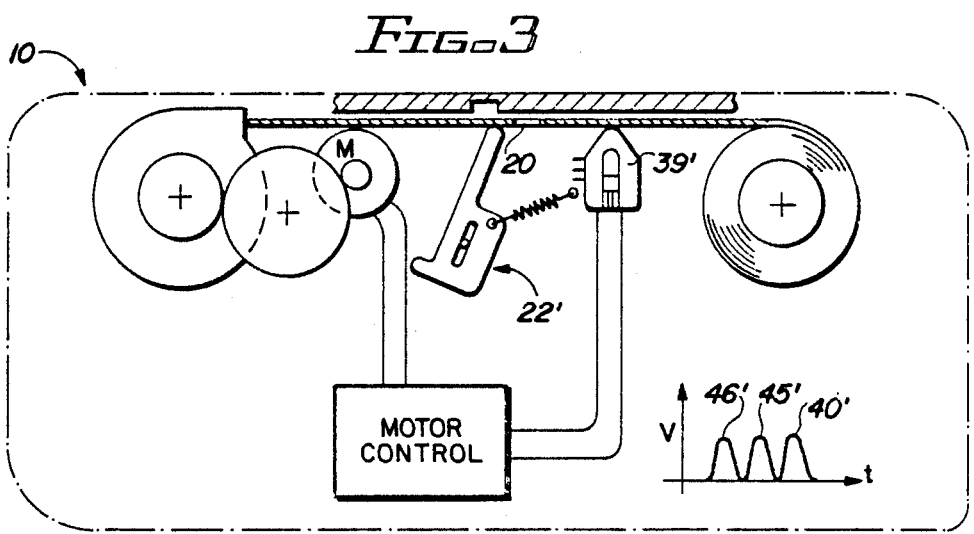
FIGS. 4 and 5 are schematic fragmentary views of a film wind system similar to that of FIGS. 1-3 employing an apparatus and method in accordance with a modified embodiment of the invention.
Figure 5:
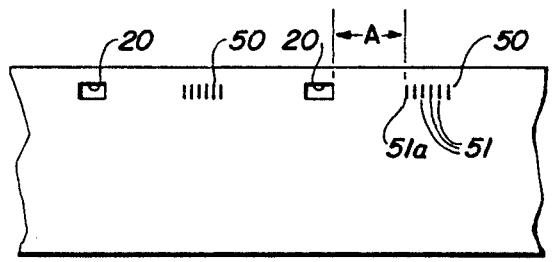

FIGS. 4 and 5 show an embodiment of the present invention in a pawl-type film registration system wherein the transport drive mechanism is augmented by a sensor 39' in the form of a read head which cooperates with auxiliary film resident fiducials in the form of readable pattern signals 50 prerecorded on a marginal portion of a loaded film F' at periodic intervals, one pattern per frame, spaced a predetermined distance "A" from a trailing edge of the pawl engaging perforations 20 previously discussed. A pawl 22' in the embodiment of FIG. 4 is provided similar to the pawl 22, discussed above, but without the need for the range of rotation provided in the pawl 22 because the monitoring of the movement of the perforations which is handled by reading the patterns 50.

As the first index 51a of the pattern 50 corresponding to the next available frame comes adjacent the sensor 39', a pulse 40' (FIG. 4) similar to the pulse 40 previously discussed will be generated. Likewise, pulses 45', 46', etc., will be developed as successive indicia 51 pass the sensor 39'. As in the first embodiment, the occurrence of each pulse 40', 45', 46' signals the passage of the perforation fiducial 20 past a certain position relative to the stop point, and the time intervals between the successive pulses 40', 45', 46' are related to the speed of film transport. The signal generated by sensor 39' can thus also function as a feedback signal input for the motor control circuit 44. Other sensors may be used in place of the sensor 39' to detect the patterns 50.

From the foregoing, it is apparent that the apparatus and method of the invention provide feedback means for controlling the frame-to-frame transfer of film in a still camera system that uses a single perforation or other film resident fiducial per frame to determine the film movement stopping point for frame registration, so that the speed of transfer can be maximized without the disadvantages inherent in high speed transfer using conventional systems of the same type.

Those skilled in the art to which the invention relates will understand that the foregoing detailed description is intended to be merely exemplary and not exclusive, and that various substitutions and modifications may be made to the described embodiments without departing from the spirit and scope of the invention as defined by the claims below.

I claim:

1. Apparatus for control of a film transport motor during the frame-to-frame advance of a film strip between exposures in a still camera that uses a single perforation or other periodic one per frame film resident fiducial to determine the film movement stopping point for frame registration, comprising:
    a motor;
    drive means operatively associated with said motor for transporting a strip of film having frame registering fiducials located one per frame at periodic intervals therealong, after said film is loaded in said camera and a frame is exposed, between a supply position and a take-up position across a frame exposure station;
    means for detecting a fiducial associated with a next available frame and for interrupting said transport of said film in response to said detection so as to stop the advance of said film when said next available frame has moved into a position of registration with said exposure station;
    means for monitoring the progressive movement of said fiducial during said film transport prior to said interruption, and for developing a signal corresponding to said movement; and
    means for varying the speed of said transport by said drive means in response to said signal to reduce the film transport speed prior to reading said stopping point.

2. Apparatus as in claim 1, wherein said monitoring means comprises means for monitoring the speed and position of said next frame fiducial and for developing a signal corresponding to said speed and position.

3. Apparatus as in claim 2, wherein said film is of a type having one perforation per frame and said detecting means comprises a mechanical metering pawl having an end arranged to engage with the next frame perforation.

4. Apparatus as in claim 3, wherein said pawl is mounted within said camera to move with said next frame perforation after engagement, and said monitoring means comprises means for monitoring the movement of said pawl.

5. Apparatus as in claim 4, wherein said pawl has indicia thereon and is mounted for rotation about a pivot, and said monitoring means comprises means for sensing said indicia when said pawl is pivoted.

6. Apparatus as in claim 5, wherein said indicia comprise spaced teeth, and said monitoring means comprises a sensor and means for developing a pulsed signal in response to the passage of successive ones of said spaced teeth past said sensor.

7. Apparatus as in claim 3, wherein said film also includes prerecorded fiducial patterns located at periodic intervals along said film strip at respective predetermined distances from said perforation's, and said monitoring means comprises means for reading said patterns and means for developing a signal corresponding to the speed and position of said patterns.

8. Apparatus for control of a film transport motor during the frame-to-frame advance of a film strip between exposures in a still camera that uses a single film resident perforation per frame to determine the film movement stopping point for frame registration, comprising:
- a motor;
- a supply reel;
- a take-up reel spaced from said supply reel across a frame exposure station;
- drive means operatively associated with said motor and said reels for transporting a strip of film having a plurality of single perforations per frame located at periodic frame spacing intervals along said film, after said film is loaded in said camera and one of said frames has been exposed at said exposure station, between said supply reel and said take-up reel across said frame exposure station;
- a pawl having a body and a tooth;
- means mounting said pawl for engagement of said tooth with a perforation associated with a next available frame and movement with said perforation and film after said engagement;
- means operatively associated with said pawl for interrupting said transport where said next available frame has been moved into a position of registration with said exposure station;
- means for monitoring the progressive movement of said perforation during said transport prior to said interruption, and for developing a signal corresponding to said movement; and
- means for varying the speed of said transport by said drive means in response to said signal to reduce the film transport speed prior to reaching said stopping point.

9. Apparatus as in claim 8, wherein said monitoring means comprises means for monitoring the movement of said pawl.

10. Apparatus as in claim 9, wherein said pawl has indicia thereon and is mounted for rotation about a pivot, and said monitoring means comprises means for sensing said indicia when said pawl is pivoted.

11. Apparatus as in claim 10, wherein said indicia comprise evenly-spaced teeth located on said pawl body, and said monitoring means comprises a sensor and means for developing a pulsed signal in response to the passage of successive ones of said spaced teeth past said sensor.

12. Apparatus as in claim 8, wherein said film also includes prerecorded fiducial patterns located at periodic intervals along said film strip at respective predetermined distances from said perforations, and said monitoring means comprises means for reading said patterns and means for developing a signal corresponding to the speed and position of said patterns.

13. Apparatus as in claim 8, wherein said monitoring means comprises means for monitoring the speed and position of said next frame perforation with respect to a stop point location and for developing a signal corresponding to said speed and position.

14. Apparatus as in claim 8, further including engagement slot located in said camera, and means removably engaging said pawl tooth in said engagement slot to maintain said next available frame in registration with said exposure station until after exposure thereof.

15. In a still camera having a supply reel, a take-up reel spaced across a frame exposure station from said supply reel, a film transport motor, drive means operatively associated with said motor for transporting a strip of film loaded in said camera after exposure of a frame at said exposure station between said reels and a pawl operatively associated with a plurality of periodically spaced film resident single perforations per frame for interrupting the transport of said film between said reels when a next available frame has been moved into a position of registration with said exposure station, the improvement comprising:
- means for monitoring the progressive movement of one of said perforations during said transport and prior to said interruption and for developing a signal corresponding to the speed and position of said perforation; and
- means for varying the speed of said transport by said drive means in response to said signal, so that said film transport speed is reduced prior to reaching said stopping point.

16. The improvement as in claim 15, wherein said pawl is mounted for rotation about a pivot, said pawl has spaced teeth thereon, and said monitoring means comprises a sensor, and means for developing said signal in response to passage of said teeth past said sensor.

17. The improvement as in claim 15, wherein said film also includes prerecorded fiducial patterns located at periodic intervals along said film strip at respective predetermined locations from said perforations, and said monitoring means comprises means for reading said patterns and means for developing a signal corresponding to the speed and position of said patterns.

18. A method for transporting a film strip between supply and take-up reels in a camera, for frame-to-frame advance of the film between exposures into successive frame registration with an aperture station, said film having single perforation or other periodic one per frame film resident fiducials to determine the film movement stopping point for registration, said method comprising the steps of:
- moving said film at a speed between said reels following exposure of a frame at said exposure station;
- monitoring said speed and position of a fiducial associated with the next available frame as said fiducial moves with said film;
- reducing the speed of said film movement in response to said monitoring prior to said fiducial reaching the registration stopping point; and
- stopping said film movement when said fiducial reaches said stopping point.

19. A method as in claim 18, wherein said film is of a type having a single perforation per frame, and said monitoring step comprises mating the tooth of a pawl with said perforation and monitoring the speed and position of said pawl.

20. A method as in claim 19, further comprising the step of moving said pawl into a slot when said stopping point is reached to releasably lock said next available frame in its registration position.

* * * * *